(12) United States Patent
Maeda et al.

(10) Patent No.: US 8,960,754 B1
(45) Date of Patent: Feb. 24, 2015

(54) UTILITY VEHICLE

(71) Applicant: Kawasaki Jukogyo Kabushiki Kaisha, Hyogo (JP)

(72) Inventors: Kazuhiro Maeda, Akashi (JP); Teruaki Yamamoto, Kakogawa (JP); Itsuo Takegami, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 14/090,264

(22) Filed: Nov. 26, 2013

(51) Int. Cl.
*B60R 7/04* (2006.01)

(52) U.S. Cl.
USPC ........................................ 296/37.15; 224/275

(58) Field of Classification Search
USPC .................... 296/26.08, 37.8, 37.15; 224/275
See application file for complete search history.

(56) References Cited

U.S. PATENT DOCUMENTS

| 7,014,002 | B2 | 3/2006 | Mizuta |
| 7,673,920 | B2 * | 3/2010 | Nakamura et al. .......... 296/37.15 |
| 7,677,343 | B2 * | 3/2010 | Kitai et al. ................. 180/89.17 |
| 7,735,896 | B2 * | 6/2010 | Kubota ........................... 296/69 |
| 2004/0079570 | A1 | 4/2004 | Mizuta |
| 2012/0212013 | A1 * | 8/2012 | Ripley et al. ............. 297/195.13 |

FOREIGN PATENT DOCUMENTS

JP 3754016 12/2005

* cited by examiner

*Primary Examiner* — Pinel Romain
(74) *Attorney, Agent, or Firm* — Wenderoth, Lind & Ponack, L.L.P.

(57) ABSTRACT

A utility vehicle 1 equipped with main frames 11 for forming a framework of a chassis; a ROPS (Roll-Over Protective Structure) 6 provided at an intermediate portion of the main frame in the front-rear direction of a body of the vehicle so as to enclose a cabin 5; a seat 7 disposed inside the ROPS; an engine 20 disposed under the seat; a storage box 30 disposed under the seat and on the outside of the engine in the width direction of the vehicle to store equipment requiring inspection and maintenance; and a lid 40 engaged with a box body to cover an opening 30*a* for the inspection and maintenance of the equipment.

8 Claims, 14 Drawing Sheets

UTILITY VEHICLE

BACKGROUND OF THE INVENTION

1. Field of the Invention

The present invention relates to a utility vehicle, particularly, to a structure for mounting a lid on a box body of a storage box in a utility vehicle.

2. Description of the Prior Art

A utility vehicle is designed to travel on off-roads and is used for various uses as a leisure vehicle or an agricultural working vehicle.

For example, in the utility vehicle according to the conventional technology disclosed in Japanese Patent No. 3754016, a battery for supplying electric power to start an engine or to operate an electrical equipment of the vehicle is disposed above a vehicle frame and below and in the neighborhood a driver's seat. Furthermore, an air cleaner, for filtering air to be taken into the engine, is disposed in a front box portion of an engine room for accommodating the engine and a transmission case of the vehicle.

In the utility vehicle according to the above-mentioned conventional technology, since the air cleaner is accommodated in the engine room together with the engine and the transmission case, it is difficult to say that the air cleaner is placed in a clean environment. Furthermore, although equipment, such as the battery and a filter of the air cleaner, requires periodic inspection and maintenance, since the distance between the battery disposed on the front side in the front-rear direction of the vehicle body and the air cleaner disposed at an intermediate portion in the front-rear direction of the vehicle body is large, the workability of inspection and maintenance is not good.

Moreover, in the utility vehicle according to the above-mentioned conventional technology, it is disclosed that an upper face of the front box portion is configured so as to be opened or removable so that the inside of the front box portion is exposed by removing the driver's seat located above the front box portion. However, it takes time and labor to remove the driver's seat, whereby the workability of inspection and maintenance is not good.

SUMMARY OF THE INVENTION

The present invention has been devised in view of the above-mentioned problems. An object of the present invention is to provide a structure for mounting a lid on a box body of a storage box in the utility vehicle so that inspection and maintenance work is facilitated for equipment requiring periodic inspection and maintenance, such as the battery and the filter of the air cleaner.

In order to achieve the above-mentioned object, the present invention provides a utility vehicle equipped with main frames for forming a framework of a chassis; a ROPS (Roll-Over Protective Structure) provided at an intermediate portion of the main frame in the front-rear direction of a body of the vehicle so as to enclose a cabin; a seat disposed inside the ROPS; an engine disposed under the seat; a storage box disposed under the seat and on the outside of the engine in the width direction of the vehicle to store equipment requiring inspection and maintenance; and a lid engaged with a box body of the storage box to cover an opening of the box body for the inspection and maintenance of the equipment.

(1) With configurations according to the present invention, since equipment requiring inspection and maintenance is stored in the storage box and the opening of the box body is covered with the lid, the structure for mounting of the lid on the box body is simplified, and the workability of periodic inspection and maintenance for the equipment stored in the storage box is improved.

(2) Since the opening of the box body has the three-dimensional shape, the workability of periodic inspection and maintenance is good.

(3) Since equipment to be subjected to periodic inspection and maintenance frequently is stored in the storage box, the workability of inspection and maintenance for the equipment is good.

(4) Since the storage box is disposed under the rear seat of seats arranged in two rows, the space in the cabin can be used effectively.

(5) Since the lid has engagement protrusions, the mounting/dismounting of the lid on/from the box body is facilitated.

(6) Since the lid is connected and fixed to the box body using buckles, the structure for mounting the lid on the box body is simplified and strong.

(7) Since the lid is flush with the outer contour faces of the box body, the aesthetic appearance of the storage box is good.

(8) Since the box body has protruding ribs, it is possible to prevent water from entering the inside of the storage box.

DETAILED DESCRIPTION OF THE PREFERRED EMBODIMENTS

Figure 1:
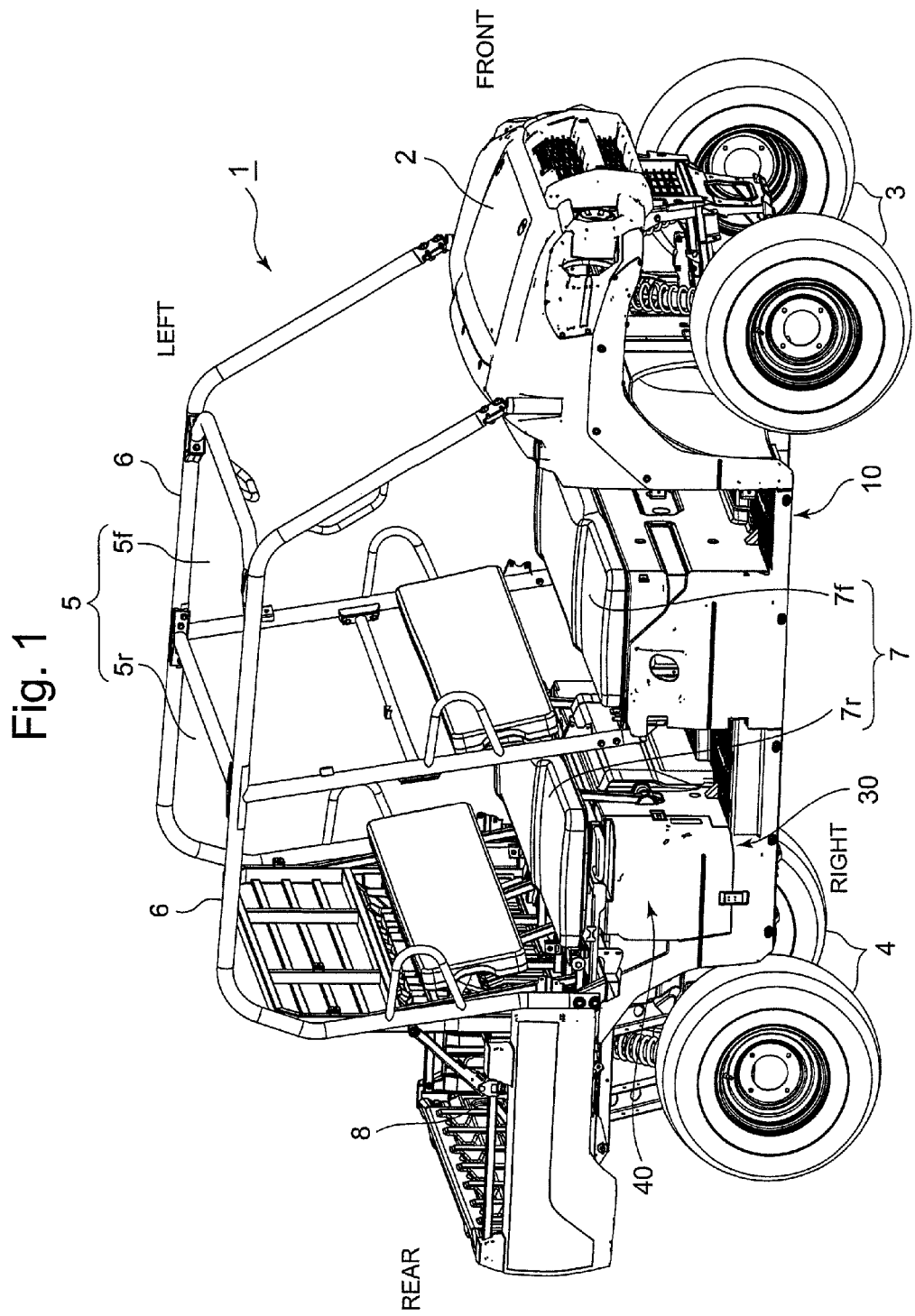
FIG. 1 is a perspective view showing a utility vehicle according to the present invention, seen from the obliquely right front thereof.

Embodiments according to the present invention will be described below referring to the drawings. The front-rear direction, the left-right direction and the up-down direction used in this specification are the directions seen from a driver riding in a utility vehicle 1.

FIG. 1 is a perspective view showing the utility vehicle 1 according to the present invention, seen from the obliquely right front thereof. The utility vehicle 1 is designed mainly to travel not only on grasslands, gravelly areas, and sandy areas, but also on off-roads, such as unpaved mountain roads and forest roads, muddy tracks, and rocky areas.

(Overall Structure of the Utility Vehicle 1)

The overall structure of the utility vehicle 1 will be described referring to FIGS. 1 and 2.

As shown in FIG. 1, the utility vehicle 1 is a four-wheeled vehicle equipped with a pair of left and right front wheels 3 at a front portion of a vehicle frame 10 and also equipped with a pair of left and right rear wheels 4 at a rear portion of the vehicle frame 10. The utility vehicle 1 is equipped with a cabin 5 enclosed with a cabin frame, i.e., a ROPS (Roll-Over Protective Structure) 6, at an intermediate portion in the front-rear direction of a vehicle body between the pair of left and right front wheels 3 and the pair of left and right rear wheels 4. A front cabin 5f and a rear cabin 5r are formed on the front side and the rear side of the cabin 5 in the front-rear direction of the vehicle body, respectively. A front seat 7f and a rear seat 7r allowing occupants to sit are provided in the front cabin 5f and the rear cabin 5r, respectively, whereby the seat 7 of the utility vehicle 1 has a two-row seat configuration. The ROPS 6 is made of round metal pipes and is formed so that front and rear portions, left and right portions and an upper portion thereof are open. A bonnet 2 is provided above the pair of left and right front wheels 3. In the space inside the bonnet 2, for example, a radiator, not shown, and other components are disposed. A steering wheel and a dashboard, not shown, are disposed at a front end portion of the front cabin 5f in the front-rear direction of the vehicle body. A loading platform 8 is provided behind the rear cabin 5r in the front-rear direction of the vehicle body and is extended rearward from a position in the neighborhood of a rear portion of the rear seat 7r above the pair of left and right rear wheels 4. A storage box 30 is disposed under the rear seat 7r and on the right side in the width direction of the vehicle.

Figure 2:
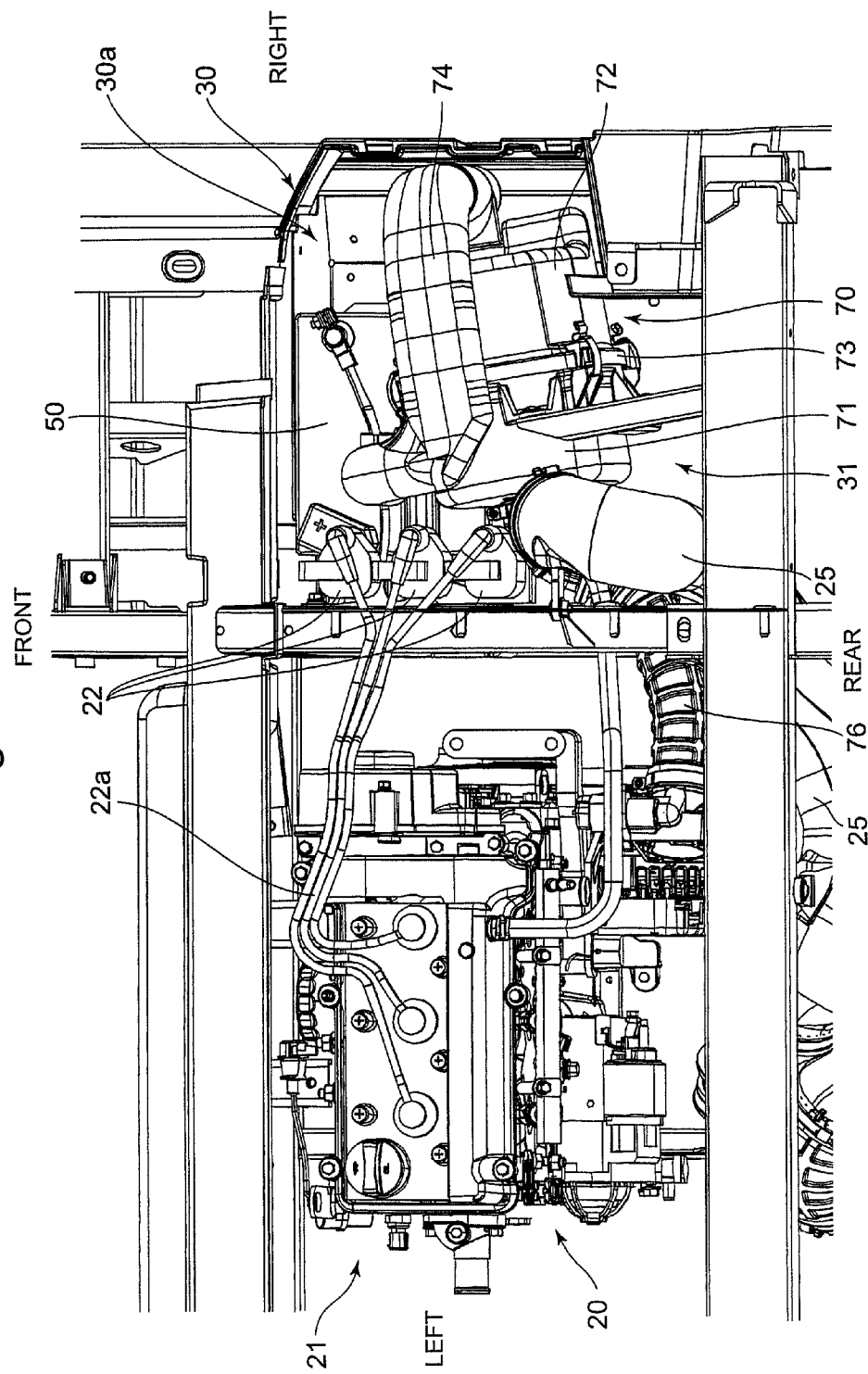
FIG. 2 is a plan view showing internal structures of a storage box and an engine room in the utility vehicle.

FIG. 2 is a top view showing a state in which a seat portion of the rear seat 7r (shown in FIG. 1) and an upper cover (not shown) installed under the seat portion are removed. The upper cover is a plate-like member made of metal, installed under the seat portion of the rear seat 7r (shown in FIG. 1) and extended in the width direction of the vehicle, thereby constituting an upper face of an engine room 21 and part of an upper face of a storage space 31. The engine room 21 is provided under the rear seat 7r and the loading platform 8 shown in FIG. 1 and at a place close to a driver's seat provided on the left side in the width direction of the vehicle. An engine 20 is disposed inside the engine room 21. A V-belt continuously variable transmission, not shown, is installed on the left side of the engine 20.

(Configuration of the Storage Space 31)

The configuration of the storage space 31 will be described referring to FIGS. 2 and 3.

As shown in FIG. 2, the storage space 31 formed by the storage box 30 is provided under the rear seat 7r (shown in FIG. 1) and on the opposite side (right side) of the engine room 21 in the width direction of the vehicle. An air cleaner 70 used as equipment, part of an air intake duct 25 for the V-belt continuously variable transmission, and a plurality of ignition coils 22 are disposed in an upper space of the storage space 31. Consequently, part of the engine room 21 and the storage space 31 are disposed under the rear seat 7r (shown in FIG. 1) in the width direction of the vehicle.

In FIG. 2, the air cleaner 70 has a two-divided structure having a main body case 71 and an air intake case 72, and a flange of the main body case 71 and a flange of the air intake case 72 are detachably connected to each other using a plurality of clamps 73. Inside the air cleaner 70, a filter, not shown, is stored. An engine suction pipe 76 to be inserted into an engine suction pipe opening 77b (shown in FIG. 3) is extended from the main body case 71. An engine air intake duct 74 is extended from the air intake case 72. The engine air intake duct 74 is first extended toward the outside (right side) in the width direction of the vehicle and then further extended while being bent toward the neighborhood of the ignition coils 22 disposed on the inside (left side) in the width direction of the vehicle. In addition, the air intake duct 25 for the V-belt continuously variable transmission is inserted into a transmission duct opening 77c (shown in FIG. 13) and further extended while being bent toward the neighborhood of the ignition coils 22.

Figure 3:
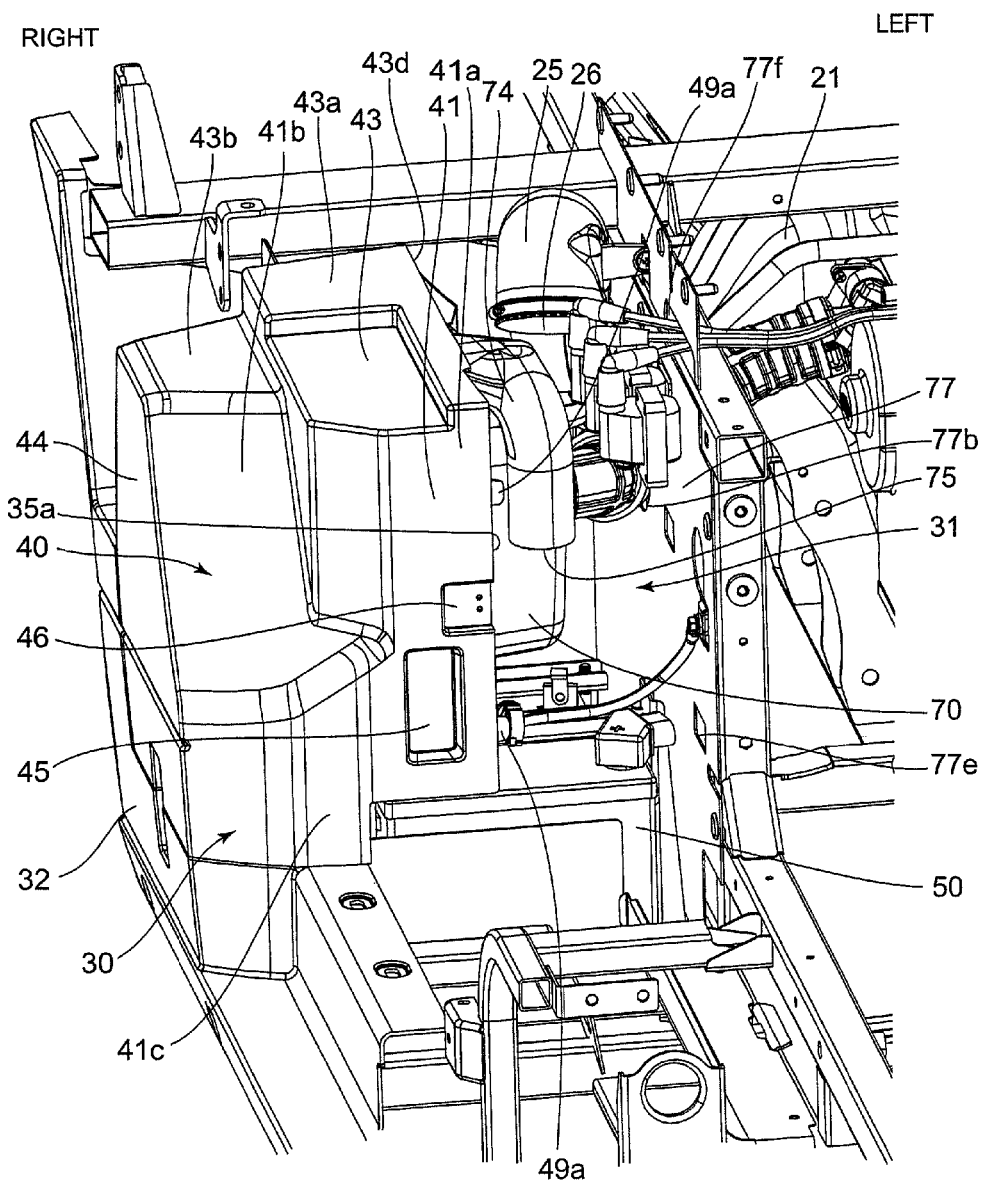
FIG. 3 is a perspective view showing a state in which a front cover and an upper cover are removed from the storage box, seen downward from the obliquely right front.

As shown in FIG. 3, in an upper space of the storage space 31, a suction opening 75 serving as a trailing end of the engine air intake duct 74 is open downward. Furthermore, a suction opening 26 serving as a trailing end of the air intake duct 25 is open downward. Hence, both the suction opening 75 of the air cleaner 70 and the suction opening 26 of the air intake duct 25 for the V-belt continuously variable transmission are disposed intensively in the storage space 31, whereby clean air is taken into the air cleaner 70 and the V-belt continuously variable transmission. Moreover, in a lower space of the storage space 31, a main battery 50 is disposed. A structure for mounting the main battery 50 will be described later in detail.

In FIG. 3, the storage space 31 and the engine room 21 are partitioned by a partitioning wall 77. The partitioning wall 77 is, for example, a plate-like member made of a rubber material. The partitioning wall 77 is provided with a plurality of openings to allow communication between the storage space 31 and the engine room 21. For example, the engine suction pipe opening 77b and the transmission duct opening 77c (shown in FIG. 13) are formed in the partitioning wall 77. Furthermore, an ignition cord opening 77f for allowing the ignition cords 22a of the ignition coils 22 shown in FIG. 2 to be inserted is formed in an upper portion of the partitioning wall 77.

(Configuration of the Storage Box 30)

The configuration of the storage box 30 will be described referring to FIGS. 4 and 5.

Figure 4:
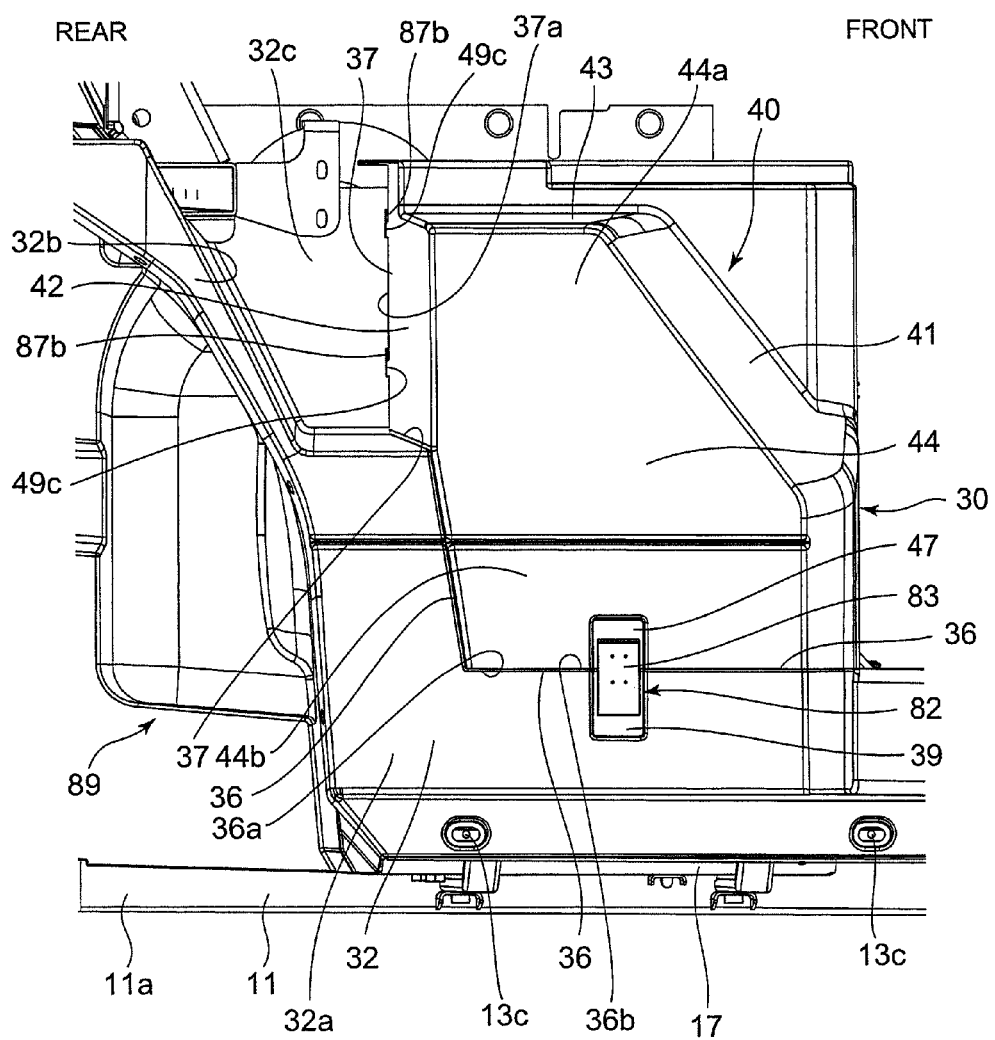
FIG. 4 is a right side view showing the storage box.

As shown in FIG. 4, the storage box 30 has a box shape enclosed by a box body 89 and a lid 40 and is configured so as to have sealability. The box body 89 is composed of a side cover 32, a right side portion of a front cover 33 (shown in FIG. 5), a right side portion of the upper cover (not shown), the partitioning wall 77 (shown in FIG. 3), and a bottom plate 17.

In FIG. 4, the side cover 32 has a three-dimensional shape having a first side wall 32a, a rear wall 32b and a second side wall 32c and is molded with resin. The first side wall 32a is extended from a rear end portion of the front seat 7f (shown in FIG. 1) toward the neighborhood of a front end of the right rear wheel 4 (shown in FIG. 1) in the front-rear direction of the vehicle body. The side cover 32 is mounted on a side frame 13 (shown in FIG. 8) using mounting screws 13c that are screw-engaged with a plurality of screw holes 13b (shown in FIG. 8) formed in an outer side face 13a (shown in FIG. 8) of the side frame 13. At an upper portion of the first side wall 32a, a concave portion 39 is formed so as to be opposed to a concave portion 47 formed at a lower side portion 44b of a side wall 44 and to allow a side buckle 83 to be embedded. An upper end 36b is formed at an upper fringe of the first side wall 32a of the side cover 32.

In FIG. 4, the rear wall 32b of the side cover 32 is extended rearward in the front-rear direction of the vehicle body from the first side wall 32a of the side cover 32, thereby having a shape of covering an upper front portion of the right rear wheel 4 (shown in FIG. 1). The second side wall 32c is extended forward in the front-rear direction of the vehicle body from an inner side end of the rear wall 32b. In a front portion of the second side wall 32c, two engagement throughholes 87b passing through in the width direction of the vehicle are formed so as to be separated from each other in the up-down direction.

Figure 5:
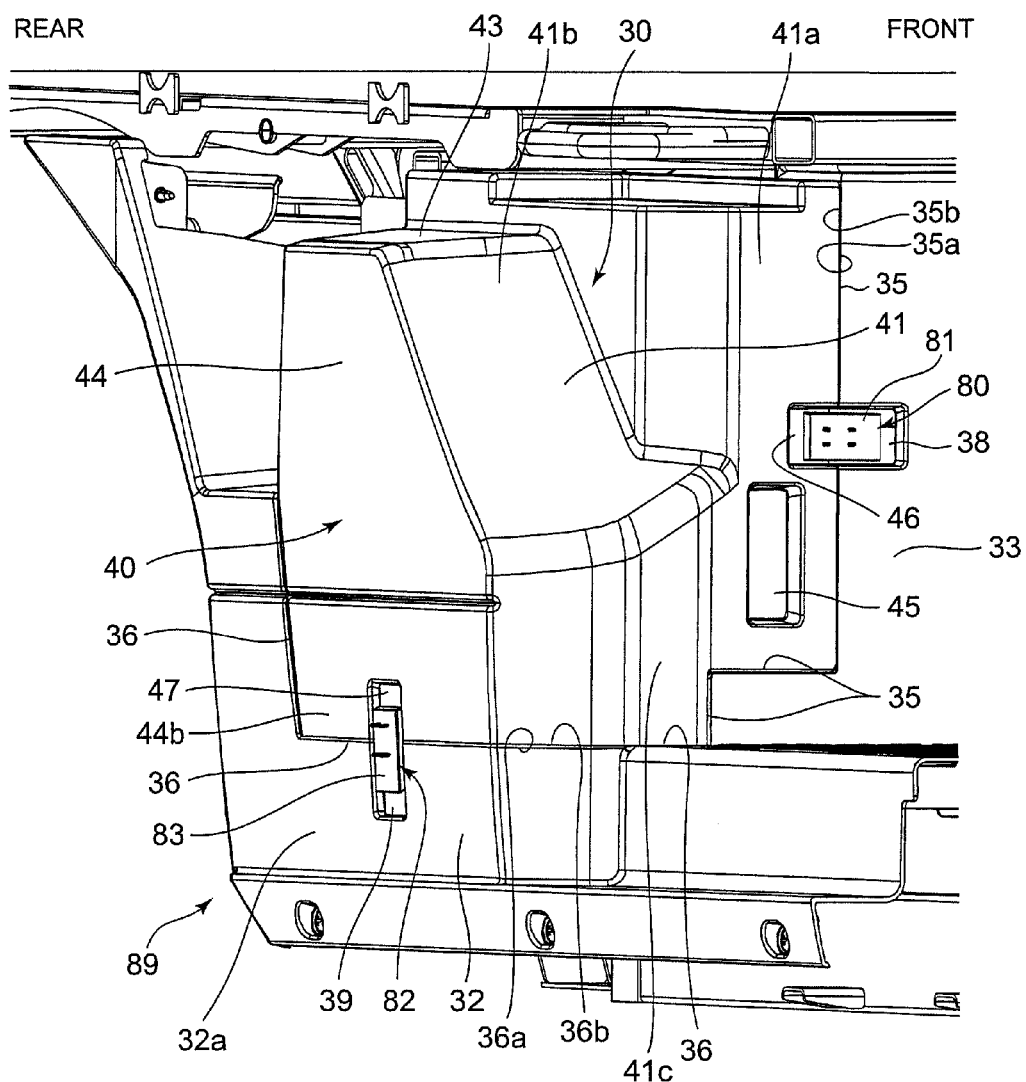
FIG. 5 is a perspective view showing the storage box shown in FIG. 4, seen from the obliquely right front.

As shown in FIG. 5, the front cover 33 is a plate-like member made of resin, positioned under the front side of the rear seat 7r (shown in FIG. 1) and extended in the width direction of the vehicle, thereby constituting the front portions of the storage space 31 and the engine room 21 shown in FIG. 2. Furthermore, at a nearly central portion of a right side end 35b of the front cover 33, a concave portion 38 is formed to allow a front buckle 81 to be embedded. A left front portion 41a of a front wall 41 of the lid 40 is equipped with an inner side end 35a making contact with the right side end 35b of the front cover 33. The inner side end 35a makes contact with the right side end 35b, thereby forming a partition line 35. Moreover, at the lid 40, the lower side portion 44b of the side wall 44 and a right lower portion 41c of the front wall 41 make contact with the first side wall 32a of the side cover 32, thereby forming a partition line 36. Moreover, since the outer contour faces of the lower side portion 44b, the right lower portion 41c and the first side wall 32a are flatly aligned with one another, the aesthetic appearances of the lid 40 and the side cover 32 are good and are configured as design members.

The upper cover, not shown, is a plate-like member made of metal and is positioned under the rear seat 7r (shown in FIG. 1) and extended in the width direction of the vehicle, thereby constituting part of the upper face of the engine room 21 (shown in FIG. 2) and part of the upper face of the storage space 31 (shown in FIG. 2). In other words, the right side portion of the upper cover overlaps with the storage space 31 (shown in FIG. 2), thereby constituting part of the box body 89 (shown in FIG. 4).

(Configuration of the Lid 40)

The configuration of the lid 40 will be described referring to FIGS. 3 and 4.

The lid 40 has a three-dimensional stereoscopic shape as shown in FIG. 3 and has the front wall 41, the rear wall 42, an upper wall 43 and the side wall 44 as shown in FIG. 4. The lid 40 is molded with resin.

As shown in FIG. 3, the front wall 41 of the lid 40 is equipped with the left front portion 41a extended in a nearly vertical direction, a right upper portion 41b inclined rearward and the right lower portion 41c extended in a nearly vertical direction. The left front portion 41a of the front wall 41 of the lid 40 is equipped with two engagement protrusions 49a separated from each other in the up-down direction at the inner side end 35a. The engagement protrusions 49a protrude inward (to the left side in the width direction of the vehicle).

In FIG. 3, the upper wall 43 of the lid 40 is equipped with a left upper portion 43a extended from an upper end of the left front portion 41a of the front wall 41 and having a stepped concave portion recessed partly and is also equipped with a right upper portion 43b for connecting an upper end of the right upper portion 41b of the front wall 41, an upper end of an upper side portion 44a of the side wall 44 and an upper end of the rear wall 42. The left upper portion 43a has an inner side end 43d making contact with a right side end of the upper cover, not shown, at a left side end thereof. At a lower portion of the left front portion 41a of the lid 40, a recessed handle portion 45 is provided so that the lid 40 can be held easily when the lid 40 is mounted and dismounted. At a nearly central portion of the left front portion 41a of the front wall 41 and a left side portion thereof in the width direction of the vehicle, a concave portion 46 is formed to allow a front buckle 81 (shown in FIG. 5) to be embedded.

As shown in FIG. 4, the side wall 44 of the lid 40 is equipped with the upper side portion 44a bent rearward from a right front end of the right upper portion 41b (shown in FIG. 3) of the front wall 41 and extended in the nearly vertical direction and is also equipped with the lower side portion 44b bent rearward from a right end of the right lower portion 41c (shown in FIG. 3) of the front wall 41. At a lower portion of the lower side portion 44b of the side wall 44 and at a nearly central portion thereof in the front-rear direction of the vehicle body, a concave portion 47 is formed to allow the side buckle 83 to be embedded. Furthermore, the rear wall 42 of the lid 40 is bent inward (to the left side in the width direction of the vehicle) from a right rear end of the upper side portion 44a of the side wall 44 and extended in the nearly vertical direction. The lower side portion 44b of the side wall 44 is equipped with a lower side end 36a making contact with an upper side end 36b of the first side wall 32a. The upper side end 36b makes contact with the lower side end 36a, thereby forming the partition line 36.

In FIG. 4, the rear wall 42 of the lid 40 is equipped with two hook-shaped engagement protrusions 49c separated from each other in the up-down direction at an inner side end 37a thereof. Each of the hook-shaped engagement protrusions 49c has a nearly L shape. In the case that the lid 40 is mounted on the side cover 32, the inner side end 37a of the rear wall 42 of the lid 40 makes contact with ribs 87 (shown in FIG. 6) respectively formed at an upper side end 32e (shown in FIG. 6) of the rear wall 32b and an outer side end 32d (shown in FIG. 6) of the second side wall 32c of the side cover 32, whereby the hook-shaped engagement protrusions 49c are respectively engaged with the engagement through-holes 87b formed in the second side wall 32c so as to be hardly detached. The inner side end 37a makes contact with both the outer side end 32d (shown in FIG. 6) and the upper side end 32e (shown in FIG. 6) of the rear wall 32b of the side cover 32, thereby forming a partition line 37.

(Internal Configuration of the Storage Box 30)

The internal configuration of the storage box 30 will be described referring to FIGS. 6 and 9.

Figure 9:
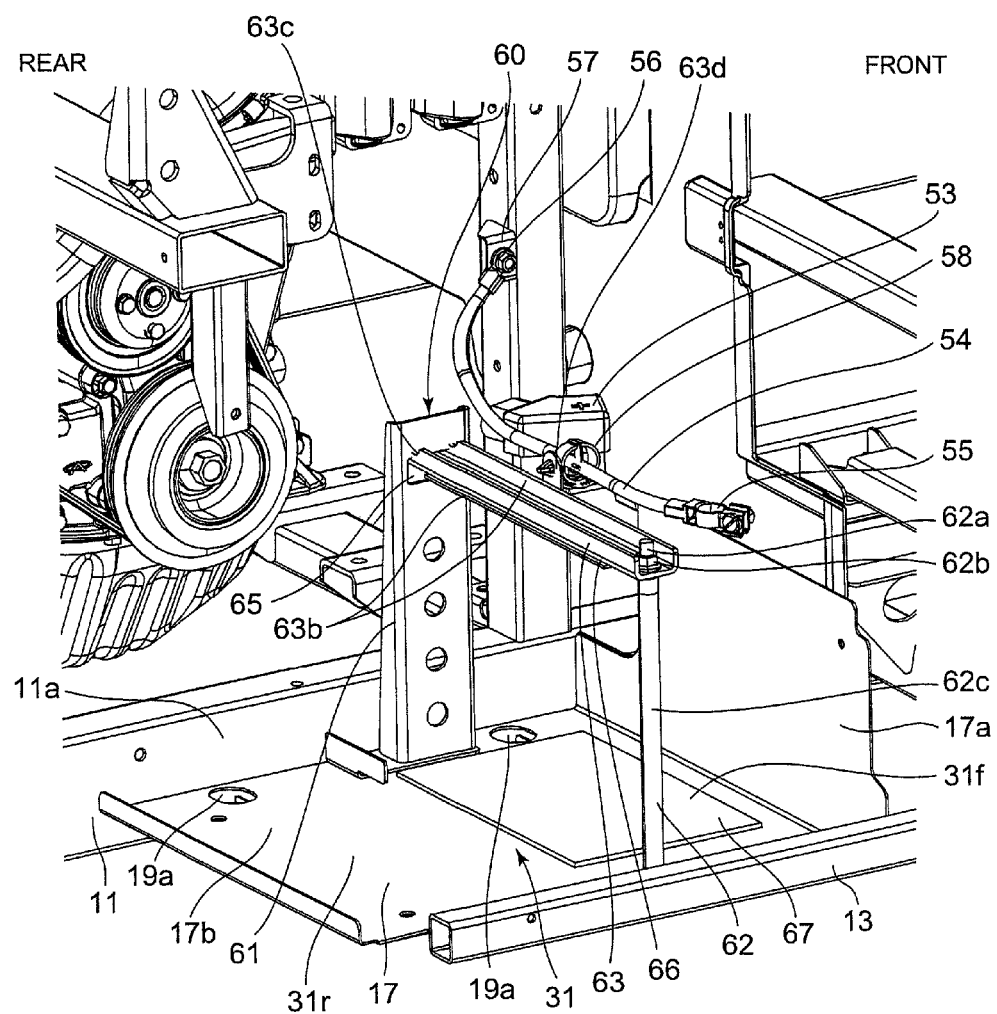
FIG. 9 is a perspective view showing a battery fixing structure inside the storage box, seen downward from the obliquely right front.

In FIG. 9, the storage space 31 formed inside the storage box 30 (shown in FIG. 5) has a front storage space 31f and a rear storage space 31r formed behind the front storage space 31f in the front-rear direction of the vehicle body. A lower side space of the front storage space 31f is configured so that the main battery 50 (shown in FIG. 6) can be installed therein. A lower side space of the rear storage space 31r is configured so that a sub-battery 90 (shown in FIGS. 13 and 14) can be stored as an option therein as described later. Hence, equipment such as the main battery 50 (shown in FIG. 6) stored inside the storage box 30 (shown in FIG. 5), is disposed under the rear seat 7r (shown in FIG. 1) and on the outside (the left side in the width direction of the vehicle) of the engine 20 (shown in FIG. 2).

Figure 6:
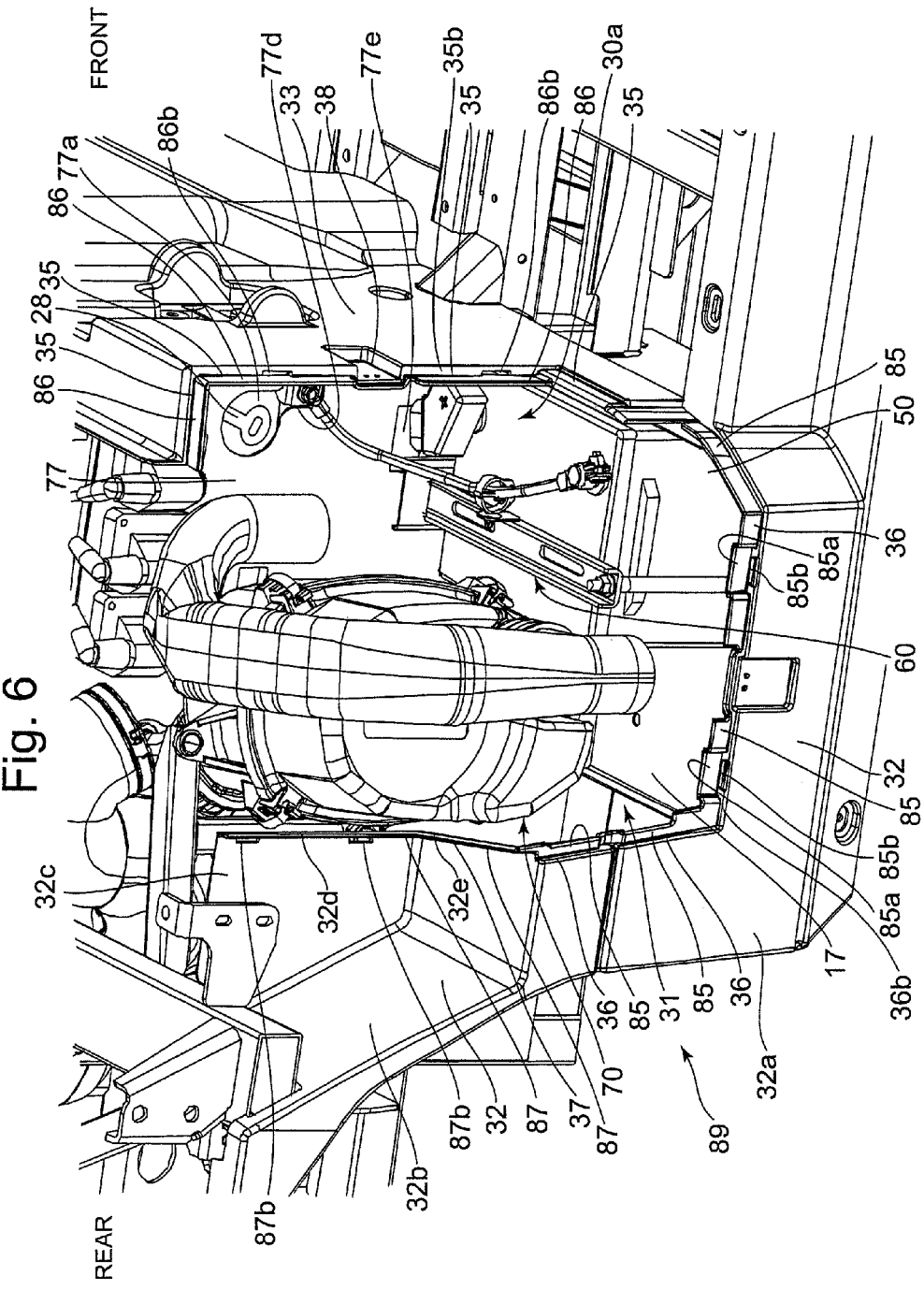
FIG. 6 is a perspective view showing a state in which a lid is removed from the box body, seen from the obliquely right front.

In addition to the engine suction pipe opening 77b (shown in FIG. 3), an oil level gauge opening 77a is formed in the partitioning wall 77 as shown in FIG. 6. The oil level gauge opening 77a is configured so that part of a grip portion of an oil level gauge 28 is visible as equipment through the oil level gauge opening 77a on the side of the storage space 31. Furthermore, a negative electrode opening 77d and a positive electrode opening 77e for the main battery 50 are respectively formed on the front side of the partitioning wall 77 in the front-rear direction of the vehicle body.

(Engagement Structure Between the Box Body 89 and the Lid 40)

The engagement structure between the box body 89 and the lid 40 (shown in FIG. 5) will be described referring to FIG. 6.

In FIG. 6, the lid 40 (shown in FIG. 5) is configured so as to be detachable from the side cover 32 and the front cover 33. When the lid 40 (shown in FIG. 5) is removed from the box body 89, a large opening 30a having a three-dimensional shape is formed in a right upper portion of the box body 89. Hence, it is possible to easily perform various kinds of work, such as the inspection and maintenance of the main battery 50 fixed using a fixing bracket 60, the replacement of the filter of the air cleaner 70, and the inspection of the amount of engine oil using the oil level gauge 28.

In FIG. 6, a right side end 35b is formed at a fringe on the outside (the right side in the width direction of the vehicle) of the front cover 33, and ribs 86 respectively protruding outward (to the right side in the width direction of the vehicle) and upward from the right side end 35b along the right side end 35b are formed behind the right end 35b in the front-rear direction of the vehicle body. In other words, the right side end 35b of the front cover 33 is fringed with the ribs 86. Furthermore, at the right side end 35b of the front cover 33, engagement grooves 86b are formed upward and downward so as to be separated from each other in the up-down direction with the concave portion 38 provided therebetween. The engagement grooves 86b are configured so that the engagement protrusions 49a (shown in FIG. 3) are respectively inserted into the engagement grooves 86b when the front cover 33 is mounted on the front cover 33 as shown in FIG. 5 and when the inner side end 35a (shown in FIG. 3) of the front wall 41 (shown in FIG. 3) makes contact with the right side end 35b of the front cover 33.

In FIG. 6, on the inside (the left side in the width direction of the vehicle) of the upper side end 36b of the first side wall 32a of the side cover 32, ribs 85 respectively protruding upward from the upper side end 36b and forward in the front-rear direction of the vehicle body along the upper side end 36b are formed. In other words, the upper side end 36b of the first side wall 32a is fringed with the ribs 85. At the upper side end 36b, two engagement grooves 85b are formed forward and rearward in the front-rear direction of the vehicle body so as to be separated from each other with the concave portion 39 provided therebetween.

Figure 11:
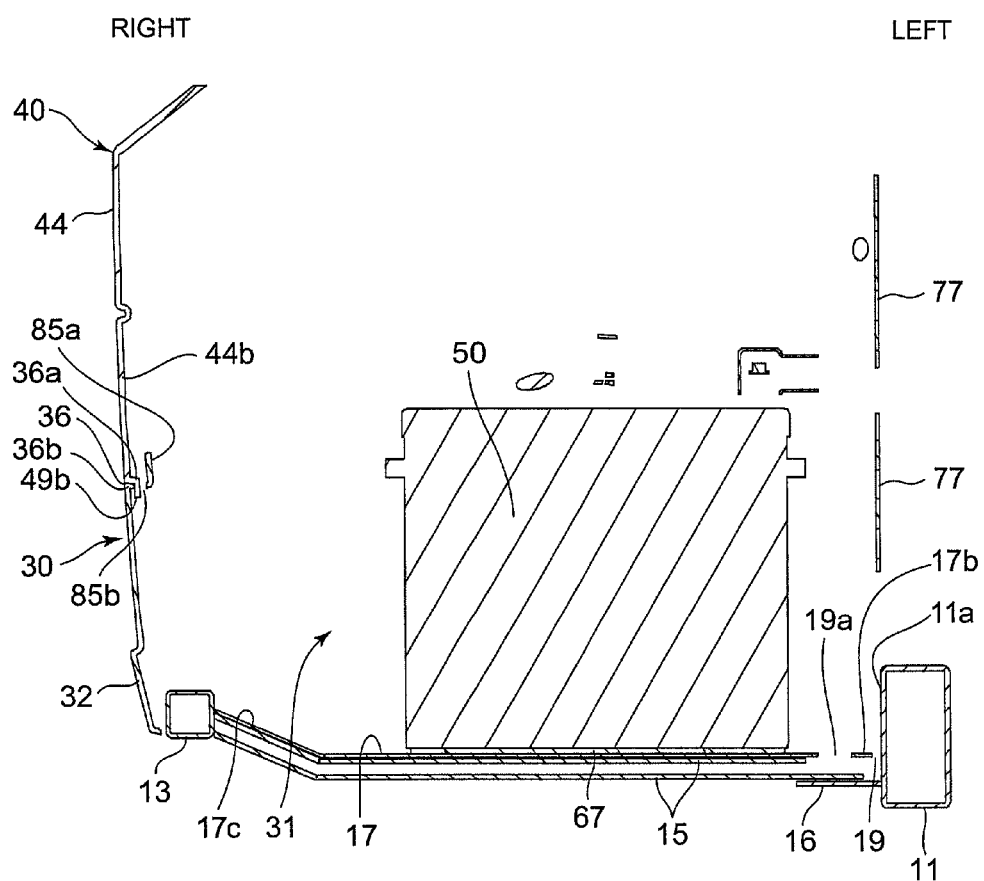
FIG. 11 is a sectional view taken on line XI-XI of FIG. 10.

As shown in FIG. 11, the lower side portion 44b of the side wall 44 is equipped with two engagement protrusions 49b separated from each other in the front-rear direction of the vehicle body at the lower side end 36a, and the engagement protrusions 49b protrude downward. The engagement protrusions 49b are configured so as to be respectively inserted into the engagement grooves 85b formed in the first side wall 32a when the lid 40 is mounted on the side cover 32 and when the lower side end 36a of the lower side portion 44b makes contact with the upper side end 36b of the side cover 32.

Returning to FIG. 6, of the ribs 85 formed at the upper side end 36b, the ribs 85 protruding upward partially have a step in the width direction of the vehicle. In other words, at each engagement groove 85b and its peripheral area, the width of the upper side end 36b is made larger, and a recessed rib 85a being recessed to the inside (the left side in the width direction of the vehicle) of the upper side end 36b is formed. The lower side portion 44b of the side wall 44 of the lid 40 shown in FIG. 4 has a stepped shape, not shown, corresponding to a stepped shape of the rib 85.

In FIG. 6, at the upper side end 32e located in front of the rear wall 32b, the rib 87 bent upward along a fold line in the width direction of the vehicle and protruding upward from the rear wall 32b is formed. At the front portion of the second side wall 32c, the rib 87 protruding to the outside (the right side in the width direction of the vehicle) is formed at the outer side end 32d bent to the outside (the right side in the width direction of the vehicle) and extended from the second side wall 32c to the outside (the right side in the width direction of the vehicle). Hence, in the side cover 32, the upper side end 32e of the rear wall 32b and the outer side end 32d of the second side wall 32c are fringed with the ribs 87.

Consequently, as shown in FIGS. 4 and 5, when the lid 40 is mounted on the box body 89, the inner side end 35a, the lower side end 36a and the inner side end 37a of the lid 40 make contact with the right side end 35b of the front cover 33, the upper side end 36b of the side cover 32 and the outer side end 32d (shown in FIG. 6), respectively, the sealability of the storage box 30 is maintained. As shown in FIGS. 4 and 5, the partition lines 35, 36 and 37 are formed at the boundary between the left front portion 41a of the front wall 41 and the front cover 33, at the boundary between the lower side portion 44b of the side wall 44 and the first side wall 32a of the side cover 32, and at the boundary between the rear wall 42 and the second side wall 32c, respectively. In addition, as shown in FIG. 6, the protruding ribs 86, 85 and 87 are formed along the partition lines 35, 36 and 37, respectively, thereby preventing water from entering the inside of the storage box 30 (shown in FIG. 4) without separately using a sealing member, such as a packing. As shown in FIGS. 4 and 5, when the lid 40 is mounted on the box body 89, the inner side end 43d (shown in FIG. 3) of the left upper portion 43a makes contact with the right side end of the upper cover, not shown, at the upper wall 43 of the lid 40, thereby maintaining the sealability of the storage box 30.

(Connecting and Fixing Structure Using Connecting and Fixing Members 80 and 82)

The connecting and fixing structure using connecting and fixing members 80 and 82 will be described referring to FIG. 5.

As shown in FIG. 5, the front buckle 81 serving as a connecting and fixing member 80 is composed of a first member having a hooking concave portion, and a second member having a hook-shaped end engagement portion engaging with the hooking concave portion, and a latch portion configured so as to have a latching state or an unlatching state. The first member is riveted in a state of being embedded in the concave portion 46, and the second member is riveted in a state of being embedded in the concave portion 38 that is opposed to the concave portion 46. The lid 40 is connected and fixed to the front cover 33 by an engagement of the end engagement portion of the second member mounted on the front cover 33 with the hooking concave portion of the first member mounted on the lid 40. Furthermore, the front buckle 81 is nearly flush with the outer contour face of the front cover 33 and the outer contour face of the lid 40 so as not to protrude from the respective outer contour faces.

Similarly, the side buckle 83 serving as a connecting and fixing member 82 is composed of a first member having a hooking concave portion, and a second member having a hook-shaped end engagement portion engaging with the hooking concave portion, and a latch portion configured so as to have a latching state or an unlatching state. The first member is riveted in a state of being embedded in the concave portion 47, and the second member is riveted in a state of being embedded in the concave portion 39 that is opposed to the concave portion 47. The lid 40 is connected and fixed to the side cover 32 by an engagement of the end engagement portion of the second member mounted on the side cover 32 with the hooking concave portion of the first member mounted on the lid 40. Furthermore, the side buckle 83 is nearly flush with the outer contour face of the side cover 32 and the outer contour face of the lid 40 so as not to protrude the respective outer contour faces.

In FIG. 5, since the lid 40 is connected and fixed to the box body 89 using the front buckle 81 and the side buckle 83, the lid 40 can be prevented from falling and the sealability of the storage box 30 can be improved. In addition, since the front buckle 81 is mounted in the concave portions 38 and 46 and since the side buckle 83 is mounted in the concave portions 39 and 47, the front buckle 81 and the side buckle 83 are configured so as to be nearly flush with the outer contour faces of the lid 40, the side cover 32 and the front cover 33 without protruding therefrom. Hence, the front buckle 81 and the side buckle 83 are hardly released, and the aesthetic appearance of the storage box 30 is good, whereby the storage box 30 is configured as a design member.

(Structure for Mounting the Bottom Plate 17 to the Vehicle Frame 10)

The structure for mounting the bottom plate 17 to the vehicle frame 10 will be described referring to FIGS. 7 and 8.

Figure 7:
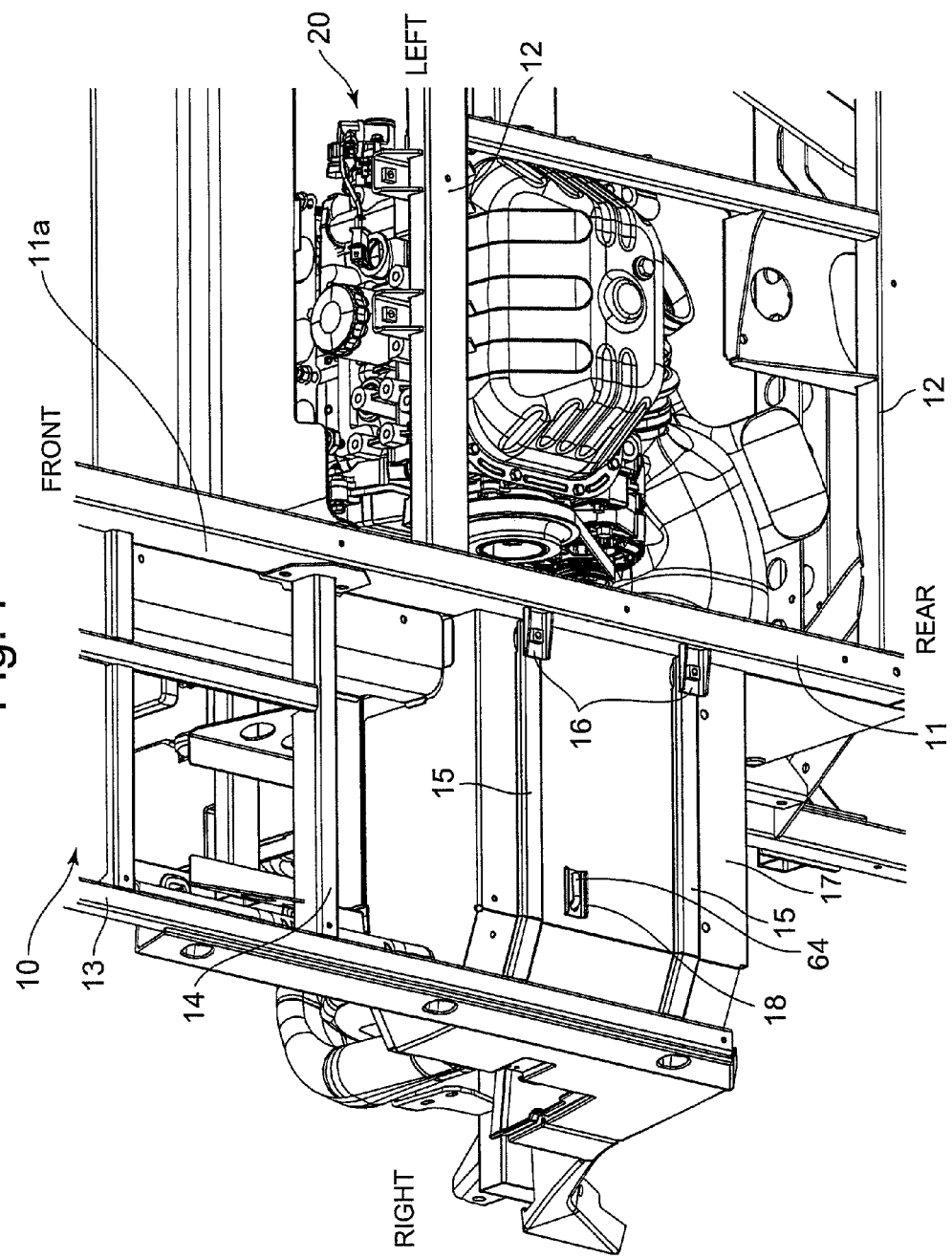
FIG. 7 is a perspective view showing bottom portions of the storage box and the engine room, seen upward from the obliquely right front.

As shown in FIG. 7, the vehicle frame 10 is equipped with main frames 11 located in a lower part of the utility vehicle 1 (shown in FIG. 1) and extended in the front-rear direction of the vehicle body, side frames 13 located on the outside of the main frames 11 in the width direction of the vehicle and extended in the front-rear direction of the vehicle body, cross members 12 for connecting the left and right main frames 11, and cross members 14 for connecting the main frame 11 and the side frame 13. The bottom plate 17 is installed between the main frame 11 and the side frame 13 and disposed on the outside (on the right side in the width direction of the vehicle) of the engine 20.

Figure 8:
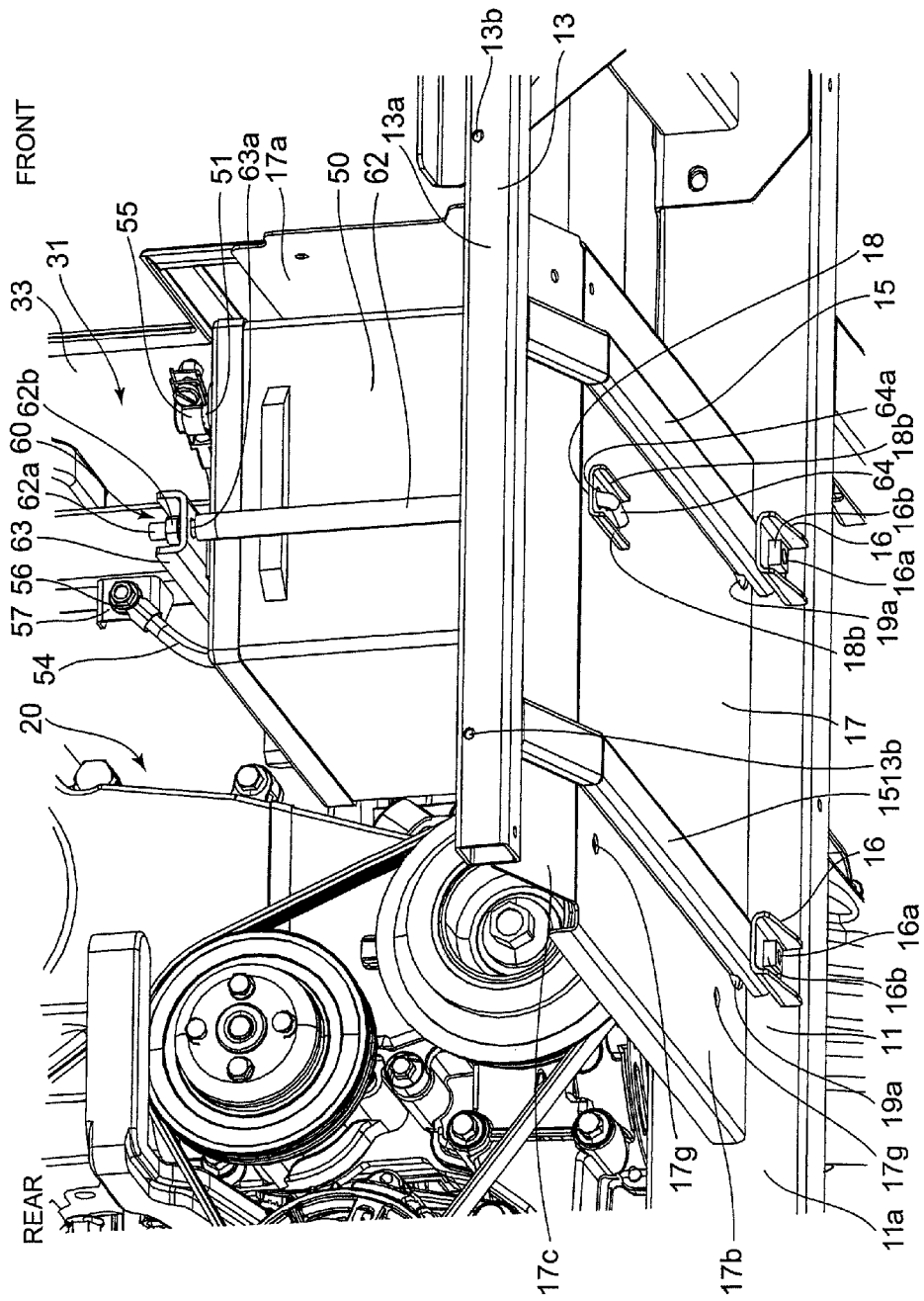
FIG. 8 is a perspective view showing a bottom plate of the storage box and its peripheral area, seen upward from the obliquely right rear.

As shown in FIG. 8, the bottom plate 17 is a plate-like member made of metal and is supported using two support arms disposed so as to be separated from each other in the front-rear direction of the vehicle body. In the width direction of the vehicle, the bottom plate 17 has a flat main face 17b which is extended in the nearly horizontal direction and on which the main battery 50, for example, is mounted, and also has an inclined face 17c bent upward to the right so as to be inclined in the neighborhood of the side frame 13. On the front side of the main face 17b in the front-rear direction of the vehicle body, a front face 17a rising from the main face 17b in the nearly vertical direction is formed. The support arms 15 are angular pipes extended in the width direction of the vehicle and configured so as to follow along a shape of a bottom face of the bottom plate 17. The support arms 15 are welded and fixed to the bottom faces of the main face 17b and the inclined face 17c. Brackets 16 are welded to a right side face 11a of the main frame 11. Two through holes 19a (shown in detail in FIG. 9) are formed in the bottom plate 17 in the neighborhood of the main frame 11 and directly above the support arms 15. The bottom plate 17 is fixed to the brackets 16 by passing bolts 16a through the through holes 19a and through mounting holes of the support arms 15 and mounting holes of the brackets 16 and by tightening the bolts with nuts 16b. Outside ends of the support arms 15 are welded and fixed to the left side face of the side frame 13, respectively (shown in FIG. 11).

As shown in FIG. 8, on the rear side of the main face 17b of the bottom plate 17 in the front-rear direction of the vehicle body, two mounting holes 17g are disposed so as to be separated from each other in the width direction of the vehicle. A hole 64a is formed in the main face 17b of the bottom plate 17 on the side of the side frame 13. A bracket 18 is welded and fixed to a lower face of the bottom plate 17 at a portion in which the hole 64a is formed. In FIG. 8, the bracket 18 has a nearly U shape directed downward and angular in cross-section in the front-rear direction of the vehicle body and has two flanges 18b extended in the width direction of the vehicle so as to be separated from each other in the front-rear direction of the vehicle body.

Figure 12:
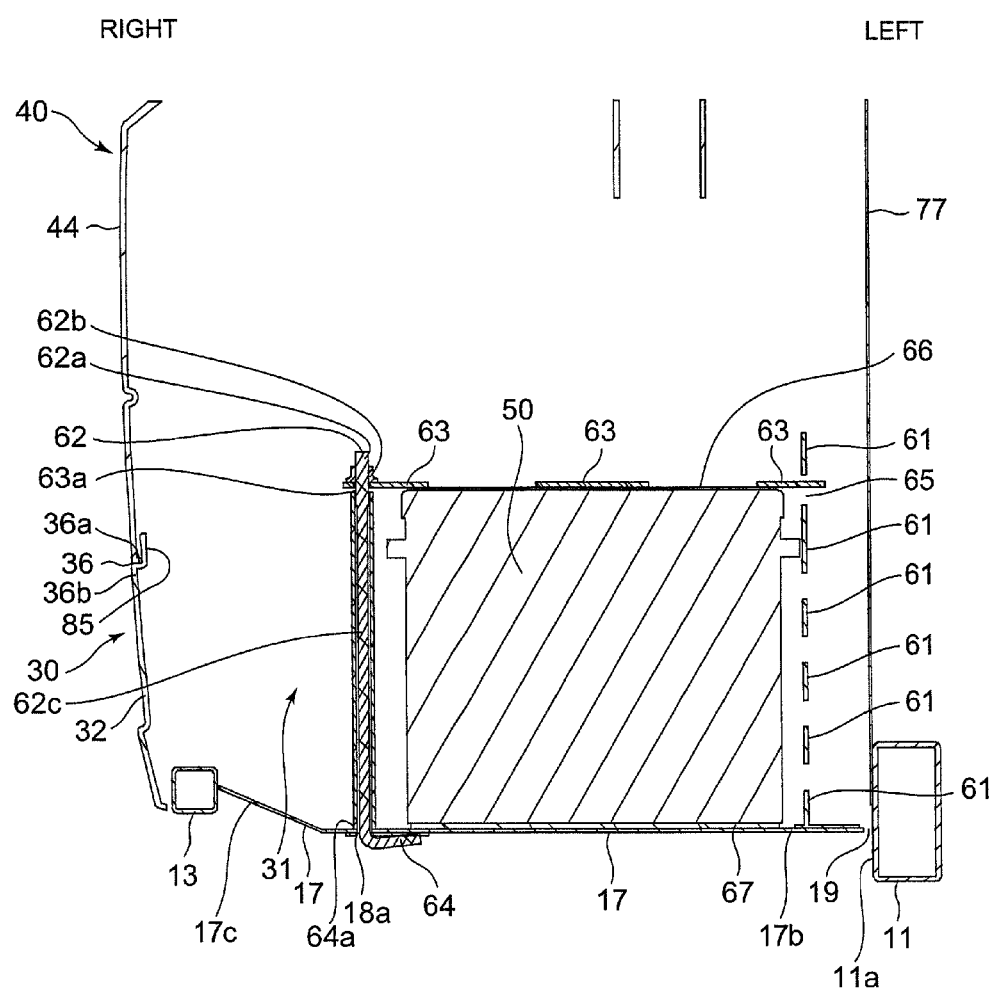
FIG. 12 is a sectional view taken on line XII-XII of FIG. 10.

As shown in FIG. 12, a hole 18a of the bracket 18 (shown in FIG. 8) is positioned so as to be communicated with the hole 64a of the bottom plate 17. A second support pillar 62 has a shaft portion 62c, a male screw portion 62a located at an upper end of the shaft portion 62c, and a bent portion 64 located at a lower end of the shaft portion 62c and bent into a nearly L shape. A leading end of the bent portion 64 of the second support pillar 62 is directed toward the main frame 11. As shown in FIG. 8, a rotation of the bent portion 64 is restricted by an engagement of the bent portion 64 with the flanges 18b of the bracket 18, whereby the flanges 18b function as a device for stopping the rotation of the bent portion 64. In addition, as shown in FIGS. 11 and 12, a gap 19 for drainage is formed between a left side end of the bottom plate 17 and a right side 11a of the main frame 11 to drain water from the inside of the storage box 30.

(Structure for Mounting the Main Battery 50)

The structure for mounting the main battery 50 (shown in FIG. 6) on the bottom plate 17 will be described referring to FIG. 9.

In FIG. 9, a first support pillar 61, the second support pillar 62 and a bridge member 63 constitute the fixing bracket 60 for fixing the main battery 50 (shown in FIG. 6) to the bottom plate 17. On the main face 17b of the bottom plate 17, the first support pillar 61 is provided on the side of the main frame 11, and the second support pillar 62 is provided on the side of the side frame 13.

The first support pillar 61 stands on and is welded to an upper face of the bottom plate 17 on the side of the front storage space 31f and on the side of the main frame 11. The first support pillar 61 has a nearly U shape being angular in cross-section in the horizontal direction, the two flange faces of the first support pillar 61 are disposed so as to be separated from each other in the front-rear direction of the vehicle body, and a support pillar face of the first support pillar 61 is disposed on the side of the side frame 13. In an upper portion of the support pillar face of the first support pillar 61, an engagement opening 65 having a nearly rectangular shape and being oblong in the front-rear direction of the vehicle body is formed. In the support pillar face of the first support pillar 61, a plurality of round holes are formed for weight reduction.

The bridge member 63 is a metallic member for connecting the first support pillar 61 to the second support pillar 62. The bridge member 63 has a nearly U shape being angular in cross-section in the front-rear direction of the vehicle body and has two flanges 63b extended in the width direction of the vehicle so as to be separated from each other in the front-rear direction of the vehicle body. A cut-out portion 63c is formed in the bridge member 63 on the side of the main frame 11. The cut-out portion 63c is engaged with the engagement opening 65 of the first support pillar 61. To the flange 63b on the front side in the front-rear direction of the vehicle body, a bracket 63d for mounting a clamp 58 is welded and fixed. A hole 63a (shown in FIG. 12) is formed in the bridge member 63 on the side of the side frame 13, and the male screw portion 62a of the second support pillar 62 is inserted into the hole 63a (shown in FIG. 12). A plurality of slots (not shown) for weight reduction are formed in a bridge body portion of the bridge member 63.

A cushion rubber 67 is bonded to an upper face of the main face 17b of the bottom plate 17 using an adhesive. Furthermore, a cushion rubber 66 is bonded to a lower face of the bridge member 63 using an adhesive. The main battery 50 is held between the cushion rubber 67 bonded to the upper face of the bottom plate 17 and the cushion rubber 66 bonded to the lower face of the bridge member 63.

A power cable 54 for a negative electrode 51 (shown in FIG. 8) electrically connects the negative electrode 51 (shown in FIG. 8) of the main battery 50 (shown in FIG. 8) to a negative electrode extraction terminal 57. The power cable 54 for the negative electrode 51 (shown in FIG. 8) has a terminal 55 detachably mounted on the negative electrode 51 (shown in FIG. 8) on the side of the side frame 13 and has a round terminal 56 that is secured to the negative electrode extraction terminal 57 with a bolt on the side of the main frame 11. By the insertion of the power cable 54 for the negative electrode 51 (shown in FIG. 8) into the clamp 58 made of resin and having a nearly ring shape, a nearly intermediate portion of the power cable 54 for the negative electrode 51 (shown in FIG. 8) is supported with the clamp 58. A power cable (not shown) for a positive electrode is mounted on the positive electrode (not shown) of the main battery 50 (shown in FIG. 8), and a protection cap 53 made of an insulating resin material is mounted so as to cover the positive electrode and a terminal of the power cable for the positive electrode. The main battery 50 (shown in FIG. 8) is disposed so that the positive electrode is located on the side of the main frame 11 and so that the negative electrode 51 (shown in FIG. 8) is located on the side of the side frame 13.

In the lower side space of the front storage space 31f, with the main battery 50 (shown in FIG. 8) placed on the main face 17b of the bottom plate 17, the cut-out portion 63c of the bridge member 63 is hooked to the engagement opening 65 of the first support pillar 61, and then the bent portion 64 (shown in FIG. 8) of the second support pillar 62 is positioned with respect to the bracket 18 (shown in FIG. 8). The male screw portion 62a of the second support pillar 62 is inserted into the hole 63a (shown in FIG. 12) of the bridge member 63, and then a nut 62b is screw-engaged with the male screw portion 62a and tightened, whereby the main battery 50 (shown in FIG. 8) is held between the bottom plate 17 and the bridge member 63. The lower side space of the rear storage space 31r is configured so that the sub-battery 90 (shown in FIG. 13) can be mounted therein as an option as described later.

(Disposition of the Sub-Battery 90)

Figure 13:
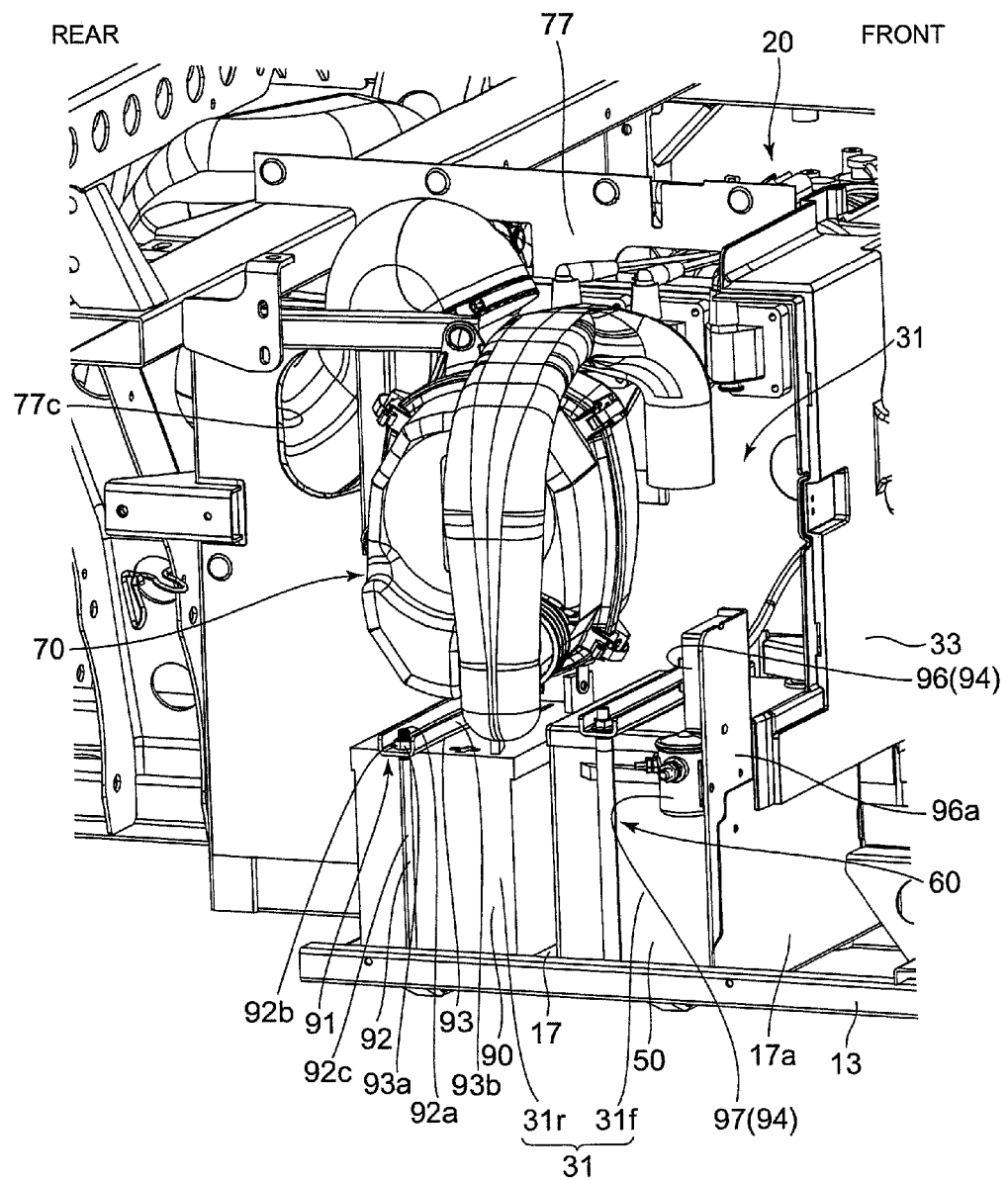
FIG. 13 is a perspective view showing a modification in which a sub-battery is mounted, seen downward from the obliquely right front.
Figure 14:
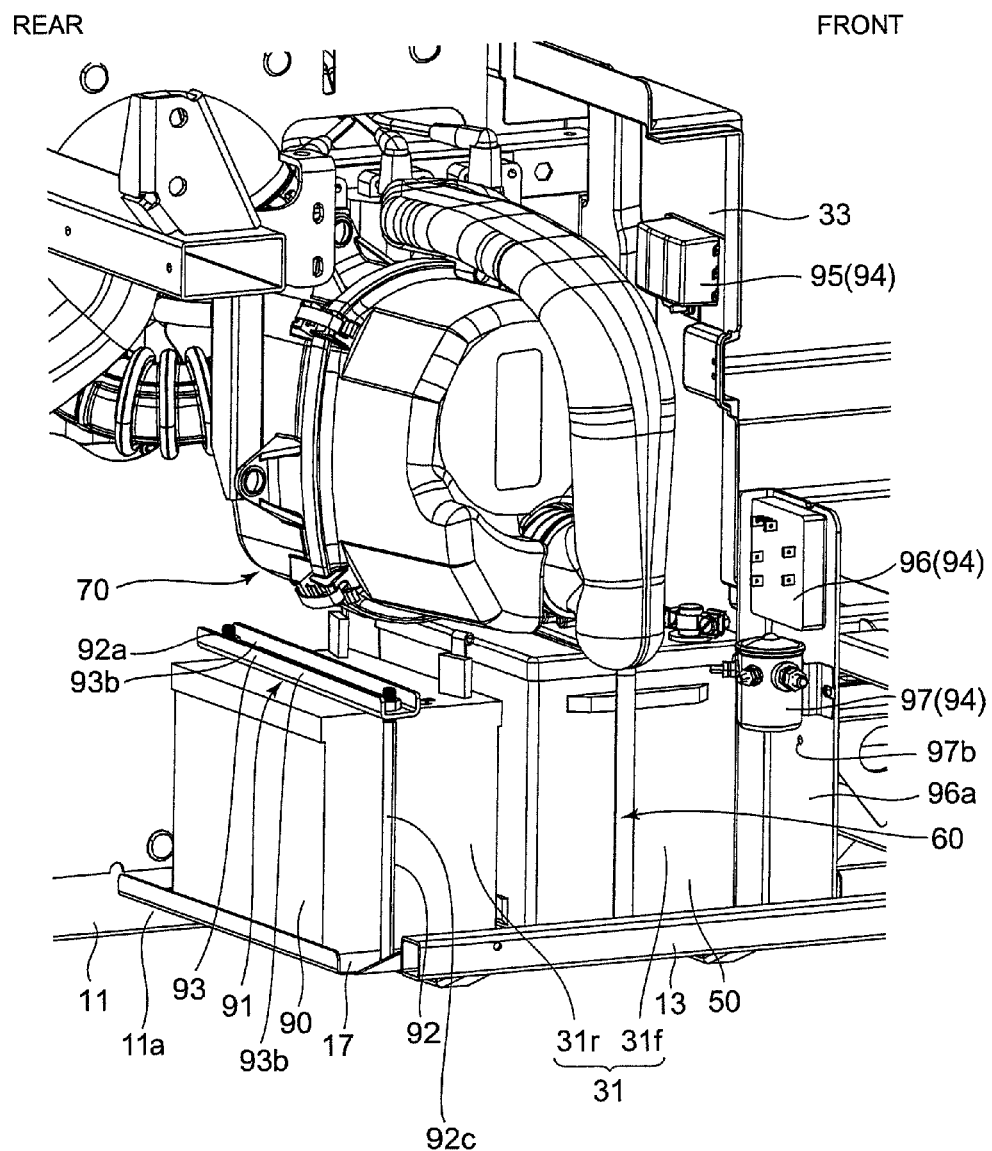
FIG. 14 is a perspective view showing the modification shown in FIG. 13, seen downward from the obliquely right rear.

A modification in which the sub-battery 90 is mounted will be described referring to FIGS. 13 and 14.

The main battery 50 is originally mounted in the utility vehicle 1 (shown in FIG. 1). However, the utility vehicle 1 is configured so that the sub-battery 90 for supplying electric power to electrical equipment to be additionally equipped as options can be mounted. The sub-battery 90 is disposed behind the main battery 50 in the front-rear direction of the vehicle body in the neighborhood of the main battery 50. Since the sub-battery 90 is an auxiliary battery for the main battery 50, an electric capacity of the sub-battery 90 is smaller than that of the main battery 50 and the sub-battery 90 is more compact than the main battery 50 in sizes, that is, length, width and height.

The sub-battery 90 is mounted in the lower side space of the rear storage space 31r. A fixing bracket 91 for fixing the sub-battery 90 to the bottom plate 17 is composed of two left and right bolts 92 and a bridge member 93. The fixing bracket 91 is configured so that the two left and right bolts 92 are detachably mounted on the bottom plate 17.

The bridge member 93 is a member for connecting the two left and right bolts 92. The bridge member 93 has a nearly U shape being angular in cross-section in the front-rear direction of the vehicle body and has two flanges 93b extended in the width direction of the vehicle so as to be separated from each other in the front-rear direction of the vehicle body. Two holes 93a are respectively formed in the bridge member 93 on the side of the main frame 11 and on the side of the side frame 13.

Figure 10:
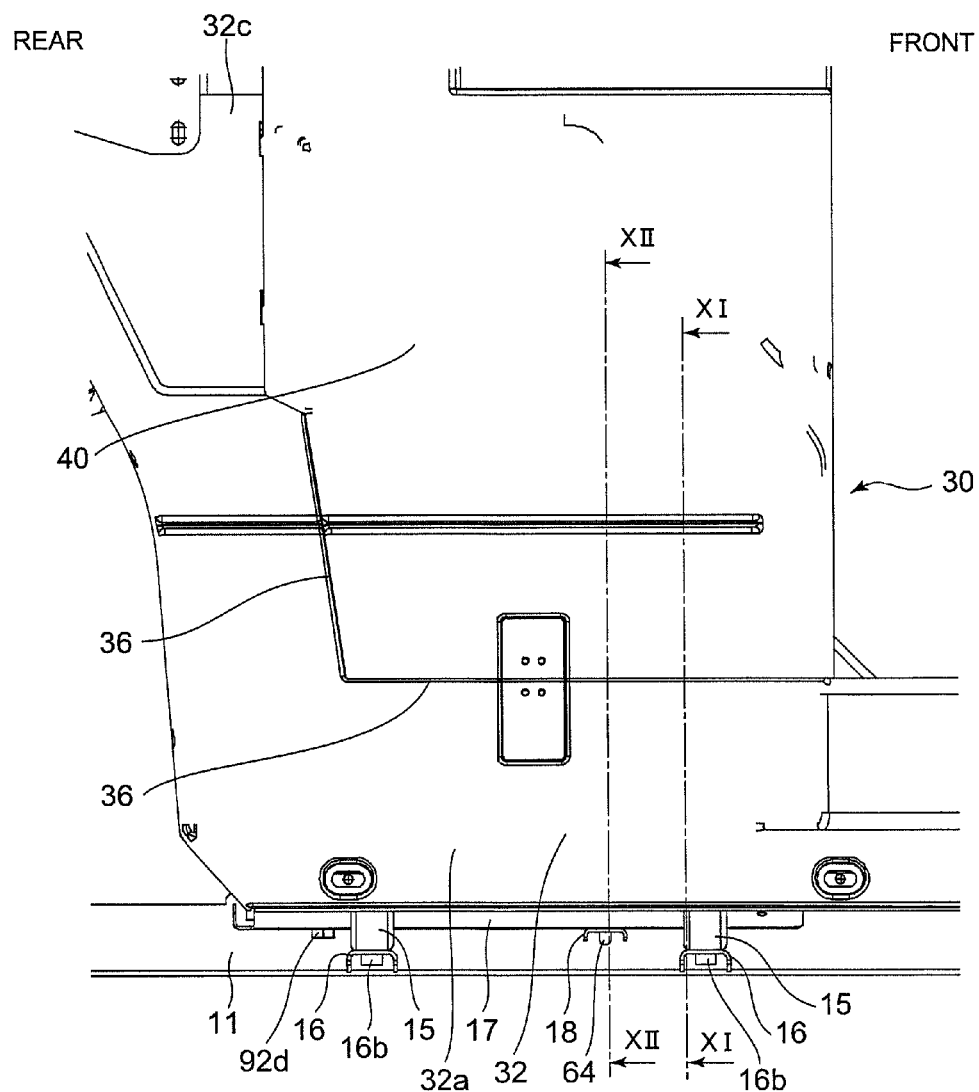
FIG. 10 is a right side view showing a main portion of the storage box.

Each of the two left and right bolts 92 has a shaft portion 92c, a male screw portion 92a on the upper end side of the shaft portion 92c, and a head portion 92d (shown in FIG. 10) on the lower end side of the shaft portion 92c. A diameter of the head portion 92d (shown in FIG. 10) is configured so as to be larger than that of the mounting hole 17g (shown in FIG. 8). The bridge member 93 is placed on an upper face of the sub-battery 90 so as to be extended in the width direction of the vehicle. Furthermore, the male screw portion 92a and the shaft portion 92c of one of the bolts 92 are inserted into the mounting hole 17g (shown in FIG. 8) upward from below, the head portion 92d (shown in FIG. 10) is engaged with the mounting hole 17g (shown in FIG. 8). After the male screw portion 92a is inserted into the hole 93a of the bridge member 93, the male screw portion 92a is screw-engaged with a nut 92b. Similarly, after the other of the bolts 92 is inserted into the mounting hole 17g of the bottom plate 17 and the hole 93a of the bridge member 93, the male screw portion 92a is screw-engaged with another nut 92b. As a result, the sub-battery 90 is fixed to the bottom plate 17 via the fixing bracket 91 by tightening the two left and right bolts 92, and the sub-battery 90 is removed from the bottom plate 17 by loosening the two left and right bolts 92. In the fixing bracket 91, the left and right bolts 92 are configured so as to be detachable.

In the case that the sub-battery 90 is mounted as an option, a control unit 94 for controlling an interaction of current between the sub-battery 90 and the main battery 50 is disposed inside the storage box 30. The control unit 94 includes a controller 95 for controlling a charging/discharging and a load of the sub-battery 90, a fuse 96 for overcurrent protection, and an electromagnetic switch 97 referred to as a contactor. The sub-battery 90 is electrically connected to the main battery 50 via the control unit 94. The controller 95 is installed at an inner upper portion of the front cover 33, as shown in FIG. 14. The fuse 96 and the electromagnetic switch 97 are mounted on an upper portion of the front face 17a of the bottom plate 17 via a bracket 96a. In other words, with a hole 97b of the bracket 96a overlapping with a hole of the front face 17a of the bottom plate 17, the bracket 96a is secured to the front face 17a of the bottom plate 17 using bolts and nuts, not shown. In this way, the control unit 94 is mounted at a high position in the storage space 31 so as not to be splashed with water or the like.

Since the sub-battery 90 is disposed in the neighborhood of the main battery 50 inside the storage box 30 (shown in FIG. 4), the sub-battery 90 can be maintained in a clean environment and can supply electricity to electrical equipment to be equipped additionally as options, whereby the cooperation between the main battery 50 and the sub-battery 90 can be facilitated.

As describe above, with the above-mentioned embodiments, the following can be attained:

(1) Since equipment requiring inspection and maintenance is stored in the storage box 30 and the opening 30a of the box body 89 is covered with the lid 40, the structure for mounting of the lid 40 on the box body 89 is simplified, and the workability of periodic inspection and maintenance for the equipment stored in the storage box 30 is improved.

(2) Since the opening 30*a* of the box body 89 has the three-dimensional shape, the workability of periodic inspection and maintenance is good.

(3) Since equipment to be subjected to periodic inspection and maintenance frequently is stored in the storage box 30, the workability of inspection and maintenance for the equipment is good.

(4) Since the storage box 30 is disposed under the rear seat 7*r* of the seats arranged in two rows, the space in the cabin 5 can be used effectively.

(5) Since the lid 40 has the engagement protrusions 49*a*, 49*b* and 49*c*, the mounting/dismounting of the lid 40 on/from the box body 89 is facilitated.

(6) Since the lid 40 is connected and fixed to the box body 89 using the buckles 81 and 83, the structure for mounting the lid 40 on the box body 89 is simplified and strong.

(7) Since the lid 40 is flush with the outer contour faces of the box body 89, the aesthetic appearance of the storage box 30 is good.

(8) Since the box body 89 has the protruding ribs 86 and 85, it is possible to prevent water from entering the inside of the storage box 30.

Although the above-mentioned embodiments have been described with respect to the utility vehicle 1 in which the seat 7 is composed of seats arranged in two rows, that is, the front seat 7*f* and the rear seat 7*r*, the above-mentioned configurations of the embodiments can also be applied to the utility vehicle 1 in which the seat 7 is composed of a row of seat, that is, only the front seat 7*f*.

The present invention is not limited to the specific configurations of the above-mentioned respective embodiments, and can include various modifications conceivable within the range not departing from the contents of the claims.

The invention claimed is:

1. A utility vehicle comprising:
   main frames for forming a framework of a chassis,
   a ROPS (Roll-Over Protective Structure) provided at an intermediate portion of the main frame in the front-rear direction of a body of the vehicle so as to enclose a cabin,
   a seat disposed inside the ROPS,
   an engine disposed under the seat,
   a storage box disposed under the seat and on the outside of the engine in the width direction of the vehicle to store equipment requiring inspection and maintenance, and
   a lid engaged with a box body of the storage box to cover an opening of the box body of the storage box for the inspection and maintenance of the equipment.

2. The utility vehicle according to claim 1, wherein
   the lid for covering the opening has a front wall, a rear wall, an upper wall and a side wall.

3. The utility vehicle according to claim 1, wherein
   the equipment is a battery, an air cleaner or an oil level gauge.

4. The utility vehicle according to claim 1, wherein
   the seat is composed of seats arranged in two rows, that is, a front seat and a rear seat, and the storage box is disposed under the rear seat.

5. The utility vehicle according to claim 1, wherein
   the lid has engagement protrusions to be engaged with the box body at an inner side end of a front wall, an inner side end of a rear wall and a lower side end of a side wall.

6. The utility vehicle according to claim 1, wherein
   the inner side end of the front wall and the lower side end of the side wall of the lid are connected and fixed to the box body using buckles.

7. The utility vehicle according to claim 1, wherein
   the buckles are configured so as to be nearly flush with outer contour faces of the lid and outer contour faces of the box body.

8. The utility vehicle according to claim 1, wherein
   the box body has protruding ribs at a right side end of a front cover and at an upper side end and an outer side end of a side cover.

\* \* \* \* \*